United States Patent
Hoshi et al.

(10) Patent No.: US 9,169,792 B2
(45) Date of Patent: Oct. 27, 2015

(54) ENGINE CONTROL SYSTEM WITH ACTUATOR CONTROL

(75) Inventors: Shinya Hoshi, Kariya (JP); Koji Ishizuka, Aichi-ken (JP); Kazuhiro Higuchi, Ichinomiya (JP); Sumitaka Ikeda, Anjo (JP); Yuuki Nakatsuji, Kariya (JP); Masahiro Asano, Kariya (JP)

(73) Assignee: DENSO CORPORATION, Kariya (JP)

( * ) Notice: Subject to any disclaimer, the term of this patent is extended or adjusted under 35 U.S.C. 154(b) by 460 days.

(21) Appl. No.: 13/421,002

(22) Filed: Mar. 15, 2012

(65) Prior Publication Data

US 2012/0239275 A1 Sep. 20, 2012

(30) Foreign Application Priority Data

Mar. 15, 2011 (JP) ................... 2011-056138

(51) Int. Cl.
*F02D 41/14* (2006.01)
*F02P 5/15* (2006.01)

(52) U.S. Cl.
CPC ........... *F02D 41/1497* (2013.01); *F02P 5/1502* (2013.01); *Y02T 10/46* (2013.01)

(58) Field of Classification Search
CPC .............................. F02P 5/1502; Y02T 10/46
USPC .......... 701/102–105; 123/254, 294, 435, 486, 123/487, 672
See application file for complete search history.

(56) References Cited

U.S. PATENT DOCUMENTS

| 4,827,718 A * | 5/1989 | Terui ............................. 60/312 |
| 5,682,317 A * | 10/1997 | Keeler et al. .................. 701/101 |
| 6,928,361 B2 * | 8/2005 | Nakayama et al. ........... 701/104 |
| 7,107,142 B2 * | 9/2006 | Harada et al. .................. 701/114 |
| 7,921,832 B2 * | 4/2011 | Ide ................................. 123/674 |
| 7,987,035 B2 * | 7/2011 | Nelson et al. ................... 701/54 |
| 2004/0211372 A1 * | 10/2004 | Shimazaki .................. 123/25 C |

FOREIGN PATENT DOCUMENTS

| JP | 2001-003796 | 1/2001 |
| JP | P2002-155783 A | 5/2002 |

(Continued)

OTHER PUBLICATIONS

Office Action (2 pages) dated Mar. 5, 2013, issued in corresponding Japanese Application No. 2011-056138 and English translation (2 pages).

*Primary Examiner* — Hieu T Vo
*Assistant Examiner* — Sherman Manley
(74) *Attorney, Agent, or Firm* — Nixon & Vanderhye P.C.

(57) ABSTRACT

An engine control apparatus works to determine target values of a plurality of combustion parameters which represent combustion states of fuel in a combustion engine and are needed to achieve required performances of the combustion engine, calculate a combustion parameter deviation that is a deviation of an actual value of each of the combustion parameters from the target value thereof, select at least one of controlled parameters correlating with the combustion parameters as a function of a degree of a selected one of the combustion parameter deviations for minimizing the selected one of the combustion parameter deviations. The controlled parameters are parameters for controlling operations of actuators working to control the combustion states of the combustion engine. The engine control apparatus controls the one of the controlled parameters, as selected by the controlled parameter selector, to minimize the selected one of the combustion parameter deviations.

3 Claims, 4 Drawing Sheets

(56) References Cited

FOREIGN PATENT DOCUMENTS

| JP | 2004-124935 | 4/2004 |
|----|-------------|--------|
| JP | 2007-100653 | 4/2007 |
| JP | P2009-156034 A | 7/2009 |
| JP | 2010-025003 | 2/2010 |
| JP | 2010-174658 | 8/2010 |
| JP | 2010-203343 | 9/2010 |

* cited by examiner

| CONTROLLED PARAMETER | RESPONSIVITY | STABILITY | CONTROL FACTOR Ka |
|---|---|---|---|
| PILOT INJECTION QUANTITY | △ | △ | 0.5 |
| PILOT INJECTION TIMING | × | ○ | 0.3 |
| MAIN INJECTION TIMING | ○ | × | 1 |

ENGINE CONTROL SYSTEM WITH ACTUATOR CONTROL

CROSS REFERENCE TO RELATED DOCUMENT

The present application claims the benefit of priority of Japanese Patent Application No 2011-56138 filed on Mar. 15, 2011, the disclosure of which is incorporated herein by reference.

BACKGROUND

1 Technical Field

This disclosure relates generally to an engine control system which may be employed in automotive vehicles and is designed to control operations of actuators such as fuel injectors to regulate a combustion state of fuel in an internal combustion engine for achieving a desired level of performance of the engine.

2 Background Art

Japanese Patent First Publication No. 2009-156034 discloses an engine control system which calculates controlled variables or parameters associated with the quantity of fuel to be injected into an internal combustion engine, the injection timing, and the quantity of intake air sucked into the engine so as to meet required engine performance parameters such as the amount of exhaust emissions (e.g., NOx and CO), output torque of the engine, the consumption of fuel in the engine, the level of combustion noise from the engine.

The engine control system compares the level of combustion noise produced when the fuel has been sprayed actually at a reference fuel injection parameter in the condition where the concentration of oxygen in a cylinder of the engine is a certain value with that expected when the fuel is sprayed according to the reference fuel injection parameter in the condition where the concentration of oxygen in the cylinder meets a target value. When a difference between them is greater than a permissible range, the engine control system corrects the reference fuel injection parameter so that the difference may fall in the permissible range and actuates a fuel injector according to the corrected reference fuel injection parameter to optimize the level of the combustion noise (i.e., one of performance parameters, as will be described later). The reference fuel injection parameter, as referred to above, may include the amount of fuel sprayed from a fuel injector in the pilot injection event or the main injection event in a multi-injection system, an injection-to-injection interval, the timing of the main injection event, or a pilot-to-main injection interval.

There may, however, be correlations between the plurality of performance parameters. The decreasing of the pilot-to-main injection interval to reduce the combustion noise (i.e., one of the performance parameters) may, therefore, result in an increase in amount of smoke (i.e., one of the performance parameters) emitted from the engine. Specifically, when the engine control system calculates target values of the performance parameters independently of each other and changes a plurality of controlled parameters for actuators simultaneously for bringing them into agreement with the target values, it may result in interference between the different types of the performance parameters in that when one of the performance parameters reaches its target value, another performance parameter deviates from its target value.

The engine control system may also be designed to use combustion parameters associated with states of combustion of fuel in the engine as intermediate parameters to regulate the controlled parameters so as to bring actual values of the performance parameters into agreement with target values thereof. When a deviation occurs between an actual value of one of the combustion parameters and a target value thereof, it is preferable to minimize such a deviation in a way suitable for instantaneous operating conditions of the engine.

SUMMARY

It is therefore an object of the invention to provide an engine control apparatus constructed to optimize the control of operations of a combustion engine which may be employed in automotive vehicles to yield desired performance of the engine.

According to one aspect of an embodiment, there is provided an engine control apparatus which may be employed in automotive vehicles. The engine control apparatus comprises: (a) a target combustion parameter determining circuit which determines target values of a plurality of combustion parameters which represent combustion states of fuel in a combustion engine and are needed to achieve required performances of the combustion engine; (b) combustion parameter deviation calculator which calculates a combustion parameter deviation that is a deviation of an actual value of each of the combustion parameters from the target value thereof; (c) a controlled parameter selector which selects at least one of controlled parameters correlating with the combustion parameters as a function of a degree of a selected one of the combustion parameter deviations for minimizing the selected one of the combustion parameter deviations, the controlled parameters being parameters for controlling operations of actuators working to control the combustion states of the combustion engine; and (d) combustion controller which controls the one of the controlled parameters, as selected by the controlled parameter selector, to minimize the selected one of the combustion parameter deviations.

When the actual values of the combustion parameters deviate from the target values thereof, it may be preferable that only some of the controlled parameters, as selected as a function of degrees of corresponding ones of the combustion parameter deviations, are used to control the operations of the actuators as compared with when all of the controlled parameters are regulated simultaneously to minimize the combustion parameter deviations. This is because the effects of changing the controlled parameters on the combustion parameters (e.g., the degrees of responsivity of the combustion parameters or the degrees of stability in minimizing the combustion parameter deviations) differ among the controlled parameters. Consequently, the engine control apparatus selects the one of the controlled parameters, which correlate with the combustion parameters resulting in the combustion parameter deviations, as a function of the degree of the selected one of the combustion parameter deviations. This enables the combustion parameter deviations to be minimized without sacrificing either of the responsivity of the engine control apparatus to the combustion parameter deviations or stability in controlling the combustion parameter deviations when the different types of controlled parameters are regulated.

In the preferred mode of the embodiment, degrees of sensitivity of each of the combustion parameters to respective changes in the controlled parameters may be predetermined. The control parameter selector selects the one of the controlled parameters which are different in degree of the sensitivity from each other as a function of the degree of the selected one of the combustion parameter deviations.

The responsivity to the combustion parameter deviations or the stability in controlling the combustion parameters will be changed depending upon changes in the combustion parameters resulting from changing of the controlled parameters (i.e., the degrees of sensitivity of the combustion parameters to the changing of the controlled parameters). The use of one of the controlled parameters which is higher in the sensitivity will, therefore, result in quick elimination of the selected one of the combustion parameter deviations. Alternatively, use of one of the controlled parameters which is lower in sensitivity will result in increased stability in eliminating the selected one of the combustion parameter deviations with less influence of disturbances or noises. The use of the degrees of the sensitivity of the combustion parameters to the changes in the controlled parameters in selecting the one of the controlled parameters will, therefore, result in improved reliability in operation of the engine control apparatus.

Some of the controlled parameters may each have correlations with some of the combustion parameters. When one of such controlled parameters is selected as a target controlled parameter to be regulated to minimize the selected one of the combustion parameter deviations, its effects on the selected one of the combustion parameter deviations will increase with an increase in the selected one of the combustion parameter deviations.

In view of the above fact, the engine control apparatus may have data on degrees of correlations between the combustion parameters and the controlled parameters and select the one of the controlled parameters which is lower in degree of correlation with the combustion parameters other than one contributing to the selected one of the combustion parameter deviations as a function of the degree of the selected one of the combustion parameter deviations. This further optimizes the control of the combustion parameter deviations.

The performances of the combustion engine are expressed by a plurality of types of performance parameters that include, for example, the torque outputted by the combustion engine, the amount of exhaust emissions (e.g., NOx, CO, or HC) from the combustion engine, the amount of smoke emitted from the combustion engine, the consumption of fuel in the combustion (e.g., a specific fuel consumption), and the level of combustion noise. Which of them should be selected to be controlled depends upon the type of demand on the combustion engine. For instance, when the combustion engine is accelerating, the torque is preferably selected to be controlled. When the combustion engine is running at a constant speed, the amount of exhaust emissions or the level of combustion noise is preferably selected to be controlled.

In view of the above fact, the engine control apparatus may also include a combustion parameter selector which selects two or more out of the combustion parameters contributing to the combustion parameter deviations. The controlled parameter selector may select the one of the controlled parameters depending upon degrees of correlation of the selected combustion parameters with each of performance parameters representing the performances of the combustion engine.

When the combustion parameter selector has selected two or more out of the combustion parameters resulting in the combustion parameter deviations, the controlled parameter selector may select two or more of the controlled parameters so that the combustion parameter deviations of the selected ones of the combustion parameters are changed in time sequence. Thus, two or more of the combustion parameter deviations will be minimized quickly.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
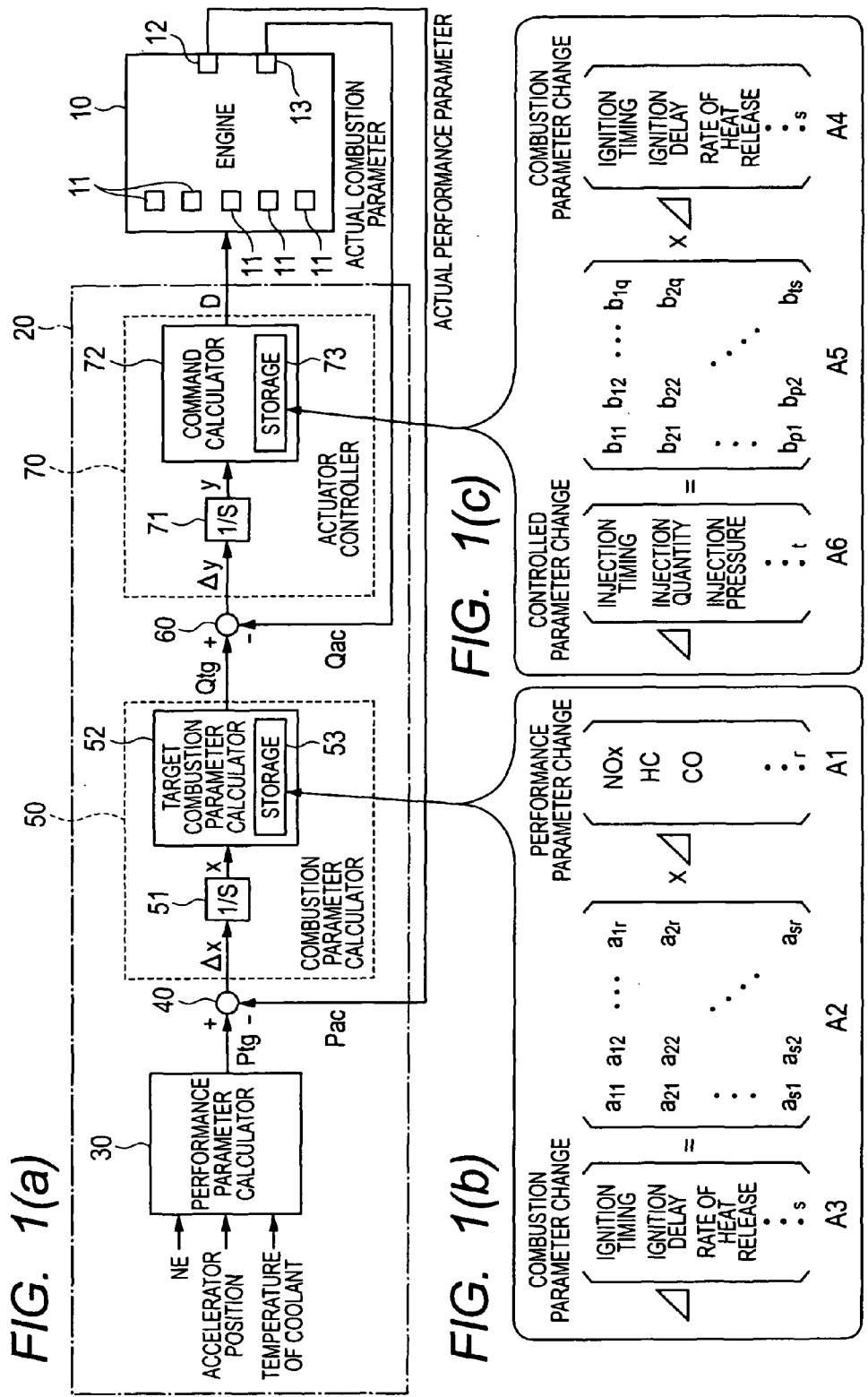
FIG. 1(a) is a block diagram which shows an engine control system according to the first embodiment.
FIG. 1(b) is an illustration which represents a determinant used as a combustion parameter arithmetic expression.
FIG. 1(c) is an illustration which represents a determinant used as a controlled parameter arithmetic expression.

Referring to the drawings, wherein like reference numbers refer to like parts in several views, particularly to FIG. 1(a), there is shown an engine control system according to the first embodiment which is designed to control an operation of an internal combustion engine 10 for automotive vehicles. The following discussion will refer to, as an example, a self-ignition diesel engine.

FIG. 1(a) is a block diagram of the engine control system implemented by an electronic control unit (ECU) 20 which works to control operations of a plurality of actuators 11 to regulate fuel combustion states of the engine 10 for yielding desired output characteristics or performance of the engine 10.

The actuators 11 used in a fuel system are, for example, fuel injectors which spray fuel into the engine 10 and a high-pressure pump which controls the pressure of fuel to be fed to the fuel injectors. The actuators 11 installed in an air intake system are, for example, an EGR (Exhaust Gas Recirculation) valve which controls the amount of a portion of exhaust gas emitted from the engine 10 to be returned back to an inlet port of the engine 10 (which will also be referred to as an EGR amount below), a variably-controlled supercharger which regulates the supercharging pressure variably, a throttle valve which controls the quantity of fresh air to be inducted into the cylinder of the engine 10, and a valve control mechanism which sets open and close timings of intake and exhaust valves of the engine 10 and regulates the amount of lift of the take and exhaust valves.

The engine 10 has installed therein performance sensors 12 and combustion state sensors 13 which provide outputs to the ECU 20. The performance sensors 12 work to measure a plurality of types of engine performances. For example, the performance sensors 12 are implemented by a NOx sensor which measures the amount of exhaust emissions (e.g., NOx, CO, and HC) emitted from the engine 10, an oxygen sensor which measures the concentration of oxygen in the exhaust emissions, a smoke sensor which measures the amount of smoke emitted from the engine 10, a torque sensor which measures torque outputted by the engine 10, and a combustion noise sensor which measures the level of combustion noise arising from combustion of fuel in the engine 10. The combustion state sensors 13 work to measure combustion states of the engine 10. For example, the combustion state sensors 13 are implemented by a cylinder pressure sensor which measures the pressure in the combustion chamber (i.e., the cylinder) of the engine 10, etc.

The engine control system is also equipped with a crank angle sensor which measures an angle (i.e., an angular position) of a crank shaft of the engine 10 and a coolant temperature sensor which measures the temperature of engine coolant.

The ECU 20 is equipped with a typical microcomputer including a CPU, a ROM, and a RAM and performs control programs, as stored in the ROM to perform engine control tasks based on instantaneous engine operating conditions of the engine 10.

Specifically, the engine control system is designed to use, as described later in detail, relations between performance parameters and combustion parameters and relations between the combustion parameters and controlled parameters to control the operations of the engine 10. The ECU 20 monitors outputs from the above described sensors to determine combustion states of fuel in the engine 10 needed to yield required performances of the engine 10 and calculates target values of the controlled parameters for the actuators 11 to achieve the determined combustion states. Specifically, the ECU 20 controls the operations of the actuators 11 so as to meet target values of the performance parameters representing the required performances of the engine 10 (which will also be referred to as target performance parameters below) simultaneously in a coordinated way.

The performance of the engine 10 is expressed by a plurality of types of performance parameters that are ones of for example, the amount of exhaust emissions (e.g., NOx, CO, or HC) from the engine 10, the amount of smoke emitted from the engine 10, the torque outputted by the engine 10, the consumption of fuel in the engine 10 (e.g., a specific fuel consumption), and the level of combustion noise. The combustion states of the engine 10, as referred to above, are expressed by a plurality of types of combustion parameters. For example, the combustion parameters are the pressure in the cylinder of the engine 10, the amount of heat release, the heat release rate, the ignition timing, the ignition lag (also called ignition delay) that is a time interval between start of spraying of the fuel from the fuel injector and the ignition of the sprayed fuel, and the ignition termination lag. The ignition timing, the ignition lag, and the ignition termination lag may be derived as a function of a change in pressure in the cylinder of the engine 10, as measured by the cylinder pressure sensor.

The engine control task to be executed by the engine control system will be described below with reference to FIGS. 1(a) to 1(c).

The ECU 20 works to calculate target values of the combustion parameters (which will also be referred to as target combustion parameters below) needed to meet the target performance parameters simultaneously and then determine command values to be outputted to the actuators 11 as representing the controlled parameters for meeting the target combustion parameters simultaneously.

Specifically, the ECU 20 serves as an engine controller and is, as illustrated in FIG. 1(a), equipped with a target performance parameter calculator 30, a combustion parameter calculator 50, an actuator controller 70, a performance parameter deviation calculator 40, and a combustion parameter deviation calculator 60.

The target performance parameter calculator 30 serves as a target performance parameter determining circuit to determine target values Ptg of the performance parameters through, for example, a target performance parameter map, as a function of an engine operating condition parameter (e.g., the speed of the engine 10 or the position of the accelerator pedal) and an environmental condition parameter (e.g., the temperature of engine coolant, the atmospheric pressure, or the temperature of ambient air). The target performance parameters Ptg are outputted to the performance parameter deviation calculator 40.

The performance parameter deviation calculator 40 calculates a deviation of an actual value Pat of each of the performance parameters from a corresponding one of the target performance parameters Ptg as a performance parameter deviation $\Delta P$. The actual values Pa of the performance parameters may be derived by outputs of the performance sensors 12 or calculated using an engine model.

The combustion parameter calculator 50 serves as a target combustion parameter determining circuit to calculate target combustion parameters Qtg that are target values of the combustion parameters required to bring actual values of the performance parameters into agreement with the target values thereof. The combustion parameter calculator 50 is equipped with an integrator 51 and a target combustion parameter calculator 52. The integrator 51 works to sum or totalize each of the performance parameter deviations $\Delta x$, as derived by the performance parameter deviation calculator 40, to produce an integral value x. The target combustion parameter calculator 52 calculates each of the target combustion parameters Qtg as a function of a corresponding one of the integral values x, as inputted from the integrator 51.

More specifically, the target combustion parameter calculator 52 is equipped with an arithmetic expression storage 53 in which a combustion parameter arithmetic expression is stored which defines correlations between the r performance parameters (p1, . . . pr) and the s combustion parameters (q1, . . . qs). The target combustion parameter calculator 52 substitutes the integral values x into the combustion parameter arithmetic expression to derive target changes $\Delta$Qtg as amounts by which the target values of the combustion parameters are to be changed and then corrects reference combustion parameters using the target changes $\Delta$Qt to derive the target combustion parameters Qtg, respectively. The reference combustion parameters are pre-determined for each operating condition of the engine 10.

FIG. 1(b) represents an example of the combustion parameter arithmetic expression used in the target combustion parameter calculator 52. The combustion parameter arithmetic expression is defined by a determinant which is so designed that the product of an r-order column vector A1 of variables representing changes in performance parameters and an s×r matrix A2 made up of entries $a_{11}$ to $a_{sr}$ is expressed as an s-order column vector A3 of variables representing changes in the combustion parameters. The combustion parameter arithmetic expression is produced by for example, the multi-regression analysis.

The combustion parameter calculator 50, as described above, works to substitute the integral values x into the combustion parameter arithmetic expression to produce the target combustion parameters Qtg, thereby minimizing steady-state deviations of actual values of the performance parameters from target values thereof. When the integral values x become zero, solutions of the combustion parameter arithmetic expression will be zero, so that the combustion states of the engine 10 are kept as they are. The target combustion parameters Qtg, as determined by the combustion parameter calculator 50, are inputted to the combustion deviation calculator 60.

The combustion parameter deviation calculator 60 samples actual values Qat of the combustion parameters and the target combustion parameters Qtg and calculates differences therebetween as combustion parameter deviations Δy. The actual values Qat of the combustion parameters may be derived by outputs of the combustion state sensors 13 or calculated using an engine model.

The actuator controller 70 is equipped with an integrator 71 and a command value calculator 72 and works as a combustion controller. The integrator 71 functions to sum or totalize each of the combustion parameter deviations Δy, as derived by the combustion parameter deviation calculator 60, to produce an integral value y. The command value calculator 72 serves as a control command determining circuit to determine command values D representing the controlled parameters associated with the operations of the actuators 11, respectively, as a function of the integral values y, as inputted from the integrator 71. The command value calculator 72 outputs each of the command values D to a corresponding one of the actuators 11 in the form of a drive signal.

More specifically, the command value calculator 72 is equipped with an arithmetic expression storage 73 in which a controlled parameter arithmetic expression is stored. The controlled parameter arithmetic expression defines correlations between changes in the s combustion parameters (q1, ... qs) and the t controlled parameters (d1, ... dt). The command value calculator 72 reads the controlled parameter arithmetic expression out of the arithmetic expression storage 73 and substitutes the integral values y into the controlled parameter arithmetic expression to derive deviations ΔD as amounts by which the controlled parameters are to be changed. The command value calculator 72 then corrects reference controlled parameters Dbs using the deviations ΔD to derive the command values D, respectively. The reference controlled parameters Dbs are pre-determined or calculated using a map for each operating condition of the engine 10.

FIG. 1(c) represents an example of the controlled parameter arithmetic expression used in the command value calculator 72. The controlled parameter arithmetic expression is defined by a determinant which is so designed that the product of an s-order column vector A4 of variables representing changes in combustion parameters and an t×s matrix A5 made up of entries $b_{11}$ to $b_{ts}$, is expressed as a t-order column vector A6 of variables representing changes in the controlled parameters. The controlled parameter arithmetic expression is produced by, for example, the multi-regression analysis.

The actuator controller 70, as described above, works to substitute the integral values y into the controlled parameter arithmetic expression to calculate the command values D, thereby minimizing steady-state deviations of actual values of the combustion parameters from target values thereof.

Figures 2, 3:
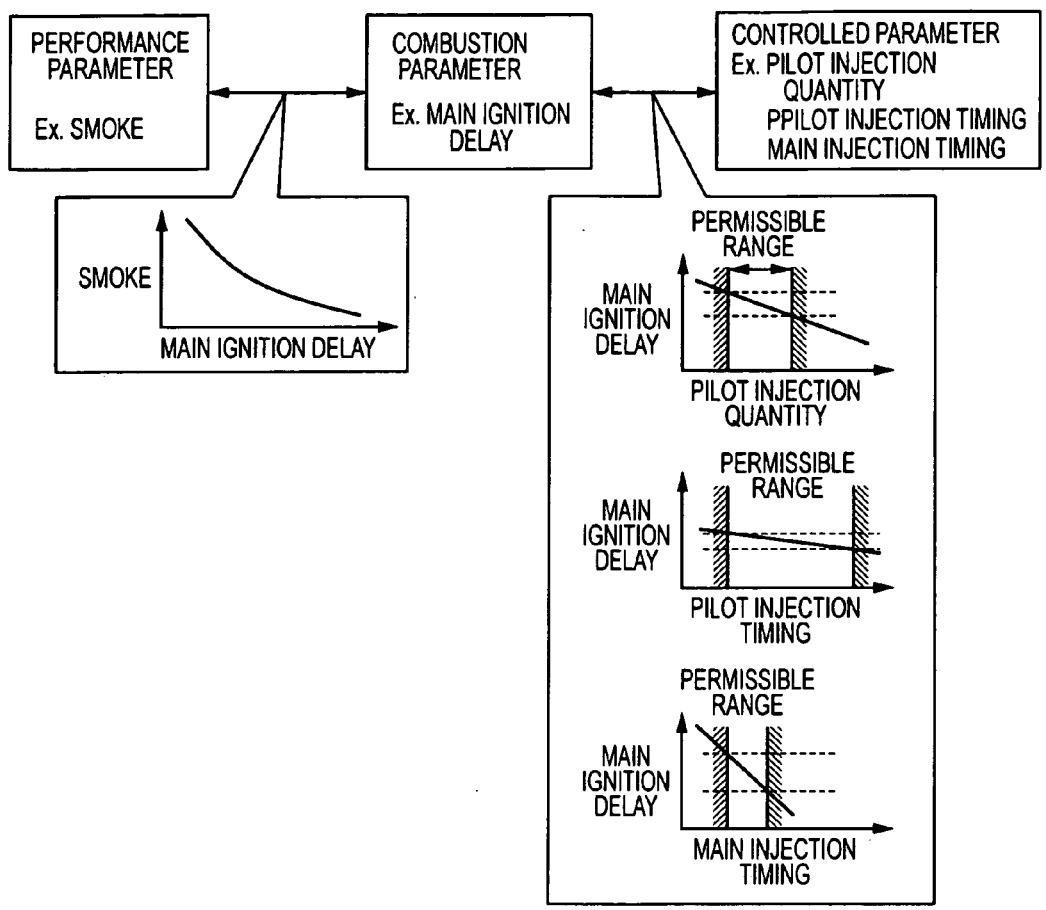
FIG. 2 is a view which demonstrates an example where the amount of smoke emitted from an internal combustion engine changes, and controlled parameters are regulated to eliminate a resulting deviation of an actual amount of the smoke from a target value thereof.
FIG. 3 is a table demonstrating values of a control factor Ka for different types of controlled parameters which correlate with a selected one of combustion parameters.

The engine control to be executed by the engine control system will be described in detail with reference to FIG. 2. FIG. 2 demonstrates an example where the amount of smoke emitted from the engine 10 that is one of the performance parameters changes, and the controlled parameters are regulated to eliminate a resulting deviation of an actual amount of the smoke from a target value thereof. The engine control system, as referred to in this example, is designed as a multi-injection system to inject fuel into the engine a plurality of times in each engine operating cycle (e.g., a four-stroke cycle) including intake or induction, compression, combustion, and exhaust.

When the actual value of the amount of smoke emitted from the engine 10 has deviated from the target value thereof, it will result in the deviation Δy between an actual value and a target value of a main ignition delay that is one of the combustion parameters correlating to the amount of smoke. The engine control system then changes the controlled parameters associated with, for example, the quantity of fuel to be sprayed into the engine 10 in a pilot injection event, the injection timing in the pilot injection event, and the injection timing in the main injection event which have a correlation with the main ignition delay so as to eliminate the deviation Δy and outputs the command values D representing the changed controlled parameters to the fuel injectors (i.e., the actuators 11), thereby bringing the amount of smoke emitted from the engine 10 into agreement with a desired value.

In the case where the actual value of any one of the combustion parameters deviates from the target value thereof, only one or some of the controlled parameters which are associated with the degree of such a deviation may be regulated to control the operations of the actuator(s) 11 without manipulating all of the combustion parameters contributing to elimination of the deviation simultaneously. This is because degrees to which changes in the controlled parameters will affect the combustion parameters are different from each other, and there are some of the controlled parameters which contribute to quick elimination of the combustion parameter deviation Δy, in other words, which are quickly responsive to the combustion parameter deviation Δy, while there are some of the controlled parameters which are lower in response speed, but minimizes the combustion parameter deviation Δy while keeping changes in the combustion parameters low.

For instance, degrees to which each of the combustion parameters changes (i.e., the degrees of sensitivity of the combustion parameters) with respective changes in the controlled parameters are different from each other. Taking the main ignition delay that is one of the combustion parameters as an example, the main injection timing that is one of the controlled parameters correlating with the main ignition delay is, as can be seen in FIG. 2, higher in the sensitivity (i.e., an inclination of a solid line), while the pilot injection timing is lower in the sensitivity. Thus, when the pilot injection timing that is one of the controlled parameters correlating with the main ignition delay is used to eliminate the combustion parameter deviation Δy, the engine control system will consume lots of time to bring the actual value of the main ignition delay into agreement with the target value thereof, in other words, the responsivity of the engine control system will drop. Conversely, when the combustion parameter deviation Δy is small, and the main injection timing that is higher in the sensitivity is used, the operation of the engine control system will be sensitive to disturbances or noises, thus resulting in instability in eliminating the combustion parameter deviation Δy.

In order to alleviate the above problems, the engine control system is designed to have data defining correlations of the controlled parameters to the combustion parameters and select one of the controlled parameters from such correlation data as a function of the degree of the combustion parameter deviation Δy or the integral value y thereof. Specifically, the engine control system has a control factor ka as an indicator representing degrees of effect of an amount by which each of the controlled parameters is changed on the respective combustion parameters and selects one of the controlled parameters which are different in value of the control factor Ka from each other depending upon the degree of the combustion parameter deviation Δy.

FIG. 3 is a table demonstrating values of the control factor Ka for the pilot injection quantity, the pilot injection timing, and the main injection timing which correlate with the main ignition delay.

The values of the control factors Ka are, as can be seen from FIG. 3, defined in terms of the responsivity of the main ignition delay to a change in each of the controlled parameters (e.g., the main injection timing, the pilot injection quantity, and the pilot injection timing) and stability in controlling the main ignition delay when each of the controlled parameters is changed. In the example of FIG. 3, the value of the control factor Ka increases in the order of the pilot injection quantity, the pilot injection timing, and the main injection timing as a function of degree of the sensitivity of the main ignition delay. The value of the control factor Ka is so determined that as it increases, the responsivity increases, while it decreases, the stability increases.

Figure 4A:
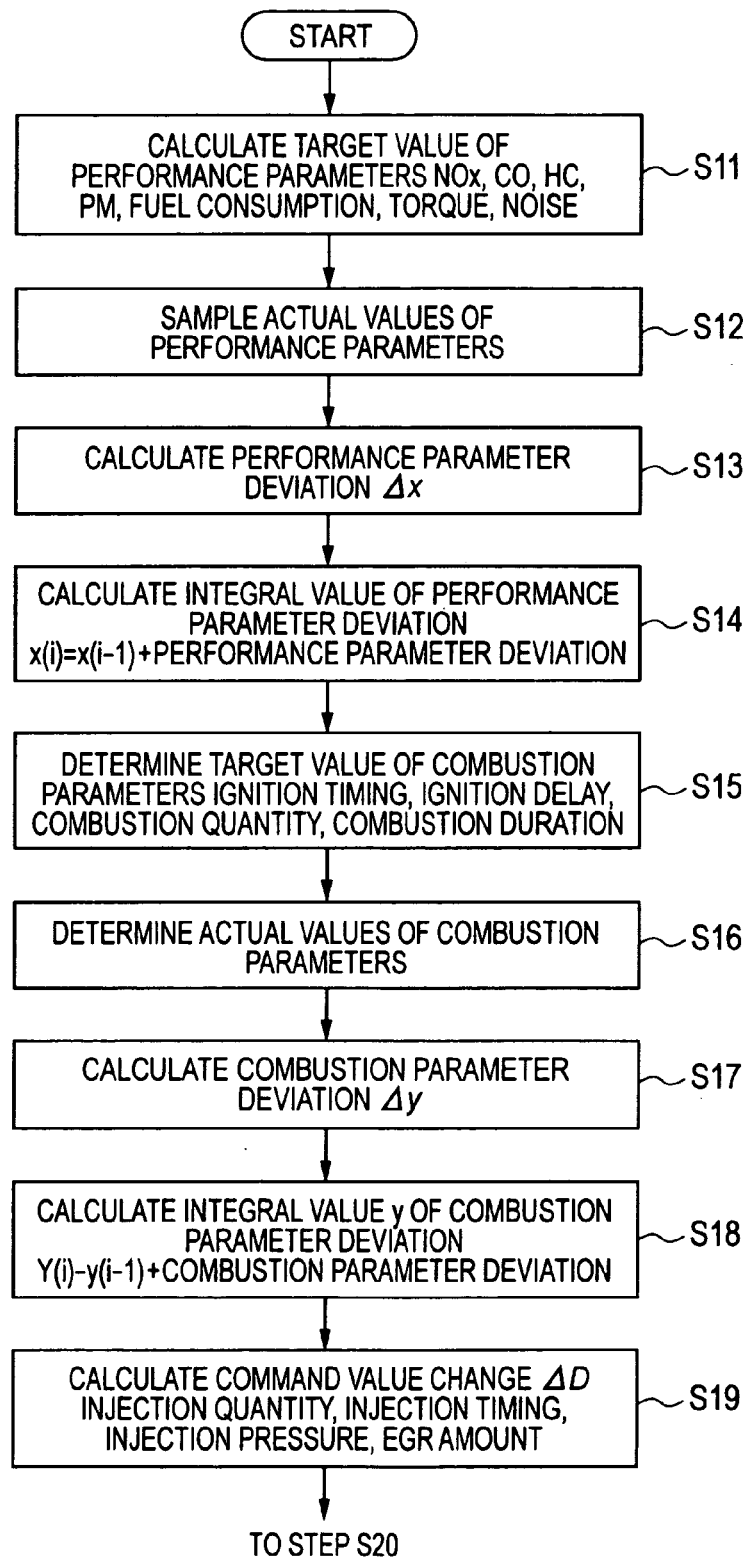
FIGS. 4(a) and 4(b) are a flowchart of an actuator control program to be executed by the engine control system of FIG. 1(a).
Figure 4B:
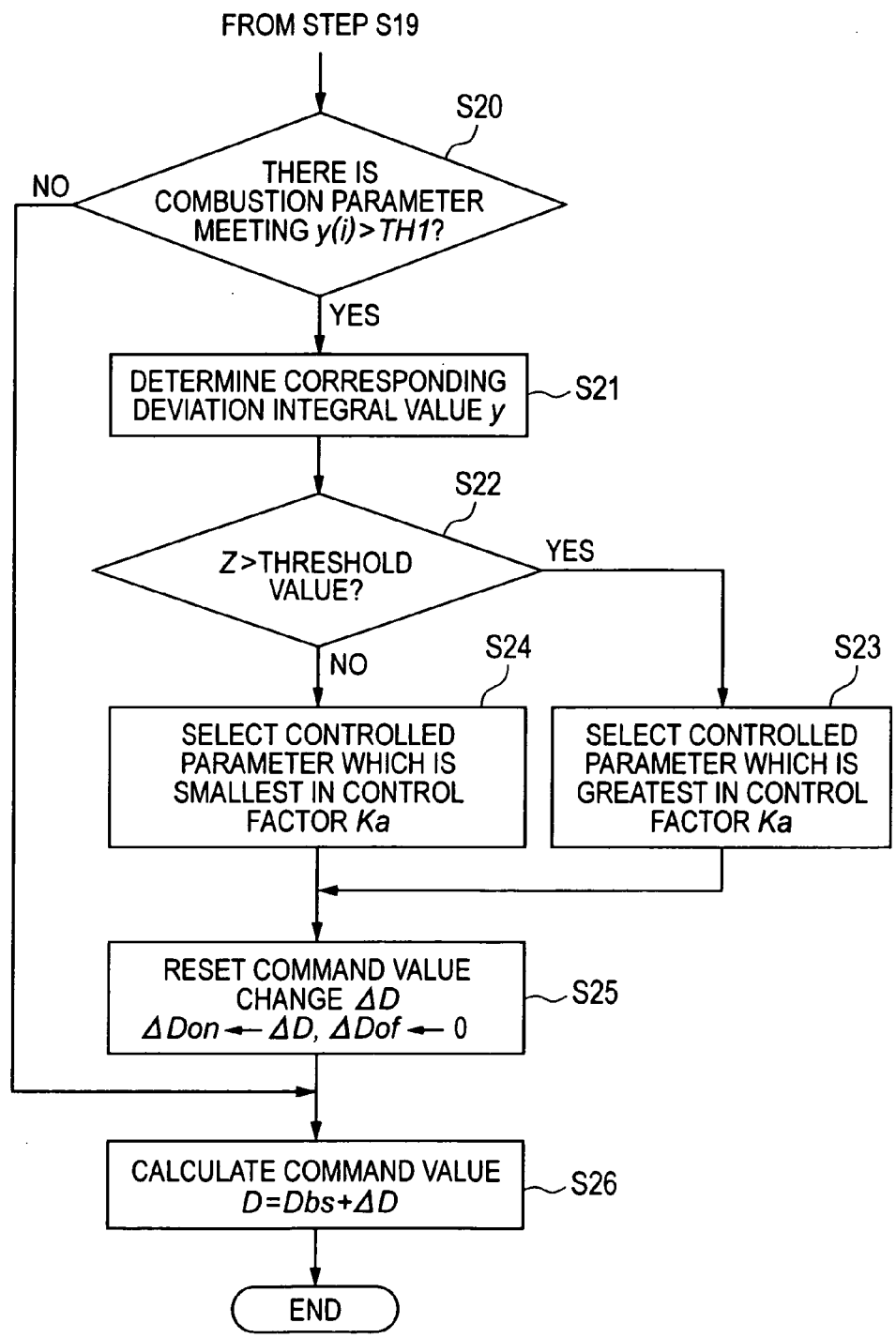

FIGS. 4(a) and 4(b) show a flowchart of a sequence of logical steps or engine control program to be executed by the ECU 20 of the engine control system at a regular interval (e.g., an operation cycle of the CPU or a cycle equivalent to a given crank angle of the engine 10).

After entering the program, the routine proceeds to step S11 wherein target values Ptg of the respective performance parameters are calculated based on operating conditions of the engine 10 such as the speed of the engine 10 and the position of the accelerator pedal of the vehicle (i.e., a driver's effort on the accelerator pedal). This operation is made by the target performance parameter calculator 30.

The routine proceeds to step S12 wherein actual values Pat of the respective performance parameters are measured from outputs of the engine output sensors 12. The ECU 20 may alternatively be designed to estimate or calculate the current performance parameters through arithmetic models and determine them as the above actual values without use of the engine output sensors 12. Such estimation may be made only on some of the performance parameters.

The routine proceeds to step S13 wherein the operation of the performance parameter deviation calculator 40 is executed. Specifically, the performance parameter deviations $\Delta x$ that are deviations of the actual values Pat of the performance parameters measured in step S12 from the target values Ptg thereof derived in step S11 are determined.

The routine proceeds to step S14 wherein the operation of the integrator 40 is executed. Specifically, a total value x(i) of each of the performance parameter deviations, as derived in step S13, is determined as a deviation integral value. More specifically, the sum of each of the total values x(i-1), as derived one program execution cycle earlier, and a corresponding one of the performance parameter deviations, as derived in this program execution cycle, is calculated as the deviation integral value x(i).

The routine proceeds to step S15 wherein the target values Qtg of the combustion parameters are calculated. Specifically, a target change $\Delta$Qtg that is an amount by which the target value of each of the combustion parameters, as determined one program execution cycle earlier, is to be changed based on a corresponding one of the deviation integral values x(i). Reference combustion parameters Qbs are corrected by the target changes $\Delta$Qtg to determine the target values Qtg of the combustion parameters. More specifically, the ECU 20 substitutes the deviation integral values x(i), as derived in step S14, into the variables of the column vector A3 of the combustion parameter arithmetic expression to derive solutions of the respective variables (i.e., entries) of the column vector A3 and determines the solutions as the target changes $\Delta$Qtg. The ECU 20 determines the reference combustion parameters Qbs through maps or mathematical formulas in terms of operating conditions of the engine 10 such as the speed of or load on the engine 10, adds the target changes $\Delta$Qtg to the reference combustion parameters Qbs to produce the target values Qtg of the combustion parameters.

The routine proceeds to step S16 wherein outputs of the combustion state sensors 13 are monitored to derive actual values Qat of the combustion parameters. The ECU 20 may alternatively calculate or estimate current values of the combustion parameters through arithmetic models and determine them as the actual values Qat without use of the combustion state sensors 13. Such estimation may be made only on some of the combustion parameters.

The routine proceeds to step S17 wherein the operation of the combustion parameter deviation calculator 60 is performed. Specifically, a deviation of each of the target values Qtg of the combustion parameters, as derived in step S15, from a corresponding one of the actual values Qat of the combustion parameters, as derived in step S16, is calculated as the combustion parameter deviation $\Delta y$.

The routine proceeds to step S18 wherein the operation of the integrator 71 is performed. Specifically, a deviation integral value y(i) that is a total value of each of the combustion parameter deviations, as derived in step S17, is determined. More specifically, the sum of the total value y(i-2), as derived one program execution cycle earlier, and the combustion parameter deviation, as derived in this program execution cycle, is calculated as the deviation integral value y(i).

The routine proceeds to step S19 wherein a command value change $\Delta D$ that is an amount by which each of the command values D for the actuators 11 is to be changed is calculated. Specifically, the deviation integral values y(i) of the deviations, as derived in step S18, are substituted into the variables of the column vector A4 of the controlled parameter arithmetic expression to derive solutions of the respective variables (i.e., entries) of the column vector A6. The solutions are determined as the command value changes $\Delta D$.

The routine proceeds to step S20 of FIG. 4(b) wherein it is determined whether each of the deviation integral values y(i), as derived in step S18, is greater than a corresponding one of permissible values TH1 or not. The permissible values TH1 are pre-determined for the respective combustion parameters.

If all the deviation integral values y(i) are determined to be less than the permissible values TH1, respectively, a NO answer is obtained in step S20. The routine then proceeds directly to step S26 wherein the control command values D are calculated by adding the command value changes $\Delta D$ to the reference controlled parameters Dbs. The actuator controller 70 outputs the control command values D to the actuators 11 in the form of drive signals.

Alternatively, if a YES answer is obtained in step S20 meaning that there is at least one of the deviation integral values y(i) which is greater than a corresponding one of the permissible values TH1, then the routine proceeds to step S21 wherein one of the combustion parameters which has contributed to the one of the deviation integral values y(i) is selected as a target combustion parameter, and the one of the deviation integral values y(i) is determined as a target deviation integral value Z to be manipulated in this program execution cycle.

The routine proceeds to step S22 wherein it is determined whether the target deviation integral value Z is greater than a corresponding one of threshold values TH2 or not. The threshold values TH2 are selected for the respective combustion parameters to be greater than the permissible values TH1.

If a YES answer is obtained in step S22, then the routine proceeds to step S23 wherein some of the controlled parameters which correlate with the target combustion parameter selected in step S21 are selected. Of the selected some of the controlled parameters, one which is the greatest in value of the control factor Ka (i.e., the greatest in the responsivity) in the map of FIG. 3 is extracted as a first target controlled parameter. The correlations between the combustion parameters and the controlled parameters are, as described above, pre-determined. Thus, two of more of the controlled parameters usually have correlations with the target combustion parameter. The ECU 20 selects them one of which is to be extracted as the first target controlled parameter.

Alternatively, if a NO answer is obtained in step S22 meaning that the target deviation integral value Z is smaller than or equal to the corresponding one of threshold values TH2, then the routine proceeds to step S24 wherein some of the controlled parameters which correlate with the target combustion parameter selected in step S21 are selected. Of the selected some of the controlled parameters, one which is the smallest in value of the control factor Ka (i.e., the greatest in the stability) in the map of FIG. 3 is extracted as a second target controlled parameter. The correlations between the combustion parameters and the controlled parameters are, as described above, pre-determined. Thus, two or more of the controlled parameters usually have correlations with the target combustion parameter. The ECU 20 selects them, one of which is to be extracted as the second target controlled parameter.

After step S23 or S24, the routine proceeds to step S25 wherein the command value change ΔD of the first or second controlled parameter, as calculated in step S19, is kept as it is and defined as a command value change ΔDon, while the command value changes ΔD of the other controlled parameters are defined as command value change ΔDof of zero.

The routine proceeds to step S26 wherein the control command values D are determined in the manner, as described above, using the command value changes ΔD (i.e., ΔDon and ΔDof) and the reference controlled parameters Dbs. The control command values D are outputted to the actuators 11 of the engine 10 in the form of drive signals, respectively. The routine then terminates.

The engine control system of this embodiment offers the following advantages.

The engine control system works to use the combustion parameter arithmetic expression which defines the correlations between the different types of performance parameters and the different types of combustion parameters to determine the target values of the combustion parameters as a function of the target values of the performance parameters, respectively. The engine control system also uses the controlled parameter arithmetic expression which defines the correlations between the different types of combustion parameters and the different types of controlled parameters to determine the command values (i.e., target values) of the controlled parameters as a function of the target values of the combustion parameters.

The combustion parameter arithmetic expression is, as described above, designed to define the correlations between the plurality of performance parameters and the plurality of combustion parameters. Similarly, the controlled parameter arithmetic expression is designed to define the correlations between the plurality of combustion parameters and the plurality of controlled parameters. Therefore, unlike the prior art system which separately calculates target values of parameters corresponding to the performance parameters and the controlled parameters, the engine control system of this embodiment works to establish the harmonization of the performance parameters and the controlled parameters without any interference therebetween, thus ensuring the stability in controlling the engine 10, that is, improvement in bringing the performance parameters and the controlled parameters closer to the target values thereof simultaneously.

The engine control system is also designed to determine the target values of the controlled parameters as a function of the combustion parameter deviations Δy (or the deviation integral values y) and select, out of the controlled parameters which are pre-defined in correlation with the combustion parameter contributing to a selected one of the combustion parameter deviations Δy, one as a target to be manipulated or regulated to minimize the selected combustion parameter deviation Δy. Specifically, the engine control system has the control factor ka as an indicator representing degrees of effect of a change in each of the controlled parameters on the respective combustion parameters and selects, out of the controlled parameters which are different in value of the control factor Ka from each other, one as a target to be regulated in this control cycle as a function of the degree of the selected one of the combustion parameter deviations Δy. This enables each of the combustion parameter deviations Δy to be minimized without sacrificing either of the responsivity to the combustion parameter deviation Δy or stability in controlling the combustion parameter deviation Δy when the different types of controlled parameters are regulated.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

The engine control system of the first modification, like in the above described first embodiment, selects, out of the controlled parameters which correlate with the combustion parameter resulting in a selected one of the combustion parameter deviations Δy and are different in sensitivity of the combustion parameter to changes in the controlled parameters, one as a target to be manipulated to minimize the selected combustion parameter deviation Δy, but is designed to select, as the target, one of the controlled parameters which is lower in degree of the correlation with the combustion parameters other than the one contributing to the selected combustion parameter deviation Δy. The degrees of the correlations between the combustion parameters and the controlled parameters may be pre-defined and stored in the ECU 20. The use of the controlled parameters correlating with two or more of the combustion parameters may cause the adverse effects on the other combustion parameters to be increased as the combustion parameter deviation Δy increases. The engine control system of this embodiment selects one of the controlled parameters so as to minimize mutual interferences among the combustion parameters, thus enhancing the independence of the performance parameters.

The value of the control factor Ka may alternatively be set in terms of both the sensitivity of a selected one of the combustion parameters to changes in the controlled parameters and the degree of correlation with the other combustion parameters.

The ECU 20 may also be designed to compare pre-determined maximum permissible ranges in which the target values of the respective controlled parameters are allowed to be changed to minimize a corresponding one of the combustion parameter deviations Δy with the command value changes ΔD to select one of the controlled parameters as the first or second target controlled parameter. An amount by which the target value of a selected one of the controlled parameters is to be changed may be limited by the maximum permissible range thereof, which results in a failure in eliminating a corresponding one of the combustion parameter deviations Δy completely. The selection of the controlled parameters based on the comparison between the maximum permissible ranges and the command value changes ΔD, however, serves to control the convergence of the actual value of the combustion parameter on the target value thereof.

Specifically, in step S23 or S24 of FIG. 4, the ECU 20 selects some of the controlled parameters whose command value changes ΔD, as derived in step S19, are greater than the respective maximum permissible ranges and extracts one of the selected controlled parameters as the first or second target controlled parameter depending upon the degree of a corresponding one of the combustion parameter deviations Δy.

The ECU 20 may select one from the controlled parameters which are different in the maximum permissible ranges as the first or second controlled parameters depending upon the combustion parameter deviation Δy. For example, the ECU 20 selects one of the controlled parameters which is greater in the maximum permissible range as the combustion parameter deviation Δy increases. Alternatively, the ECU 20 selects the controlled parameters in sequence in increasing order of the size of the maximum permissible ranges. For instance, when the combustion parameter deviation Δy is relatively great, the ECU 20 first selects one of the controller parameters which is smaller in the maximum permissible range and uses it to control the combustion states of fuel in the engine 10. Subsequently, when the amount by which the target value of the selected one of the controlled parameters is to be changed has reached the maximum permissible range, the ECU 20 then selects another of the controlled parameters which is the next smallest in the maximum permissible range and uses it to control the combustion states of fuel in the engine 10.

The ECU 20 may select, as the target combustion parameter in step S21 of FIG. 4(b), one of the combustion parameters which is the greatest in the combustion parameter deviation Δy or the deviation integral values y(i) or select the combustion parameters in sequence one in each of the program execution cycles regardless of the combustion parameter deviation Δy or the deviation integral values y(i). In the latter case, the ECU 20 switches between the combustion parameters to be selected as the target combustion parameter at a given time interval or each time the combustion parameter deviation Δy has changed by a given amount.

The ECU 20 extracts in step S21 one of the combustion parameters as the target combustion parameter, but may alternatively extract two or more from the combustion parameters contributing to the combustion parameter deviations Δy as target combustion parameters and select one of the controlled parameters as the target controlled parameter depending upon degrees of correlation of the extracted combustion parameters with each of the performance parameters. This enables one of the controlled parameters to be selected as the target controlled parameter depending upon the order of priority of types of performances of the engine 10 to be controlled.

The ECU 20 selects in step S23 or S24 one of the controlled parameters as the target controlled parameter, but may alternatively select two or more from the controlled parameters as target controlled parameters and use them to minimize corresponding ones of the combustion parameter deviations Δy.

When two or more of the combustion parameters are selected as the target combustion parameters, the ECU 20 may make such selection so that corresponding ones of the combustion parameter deviations Δy may be changed sequentially. For instance, in the case where there are two combustion parameters M1 and M2, correlations of the combustion parameter M1 to two controlled parameters N1 and N2 are pre-defined, and correlations of the combustion parameter M2 to two controlled parameters N3 and N4 are pre-defined, the ECU 20 may select the controlled parameters N1 and N3 alternately as the target controlled parameters or select the controlled parameters N1 to N4 in the order of N1→N3→N2→N4. Such selection may be made at a regular time interval or each time a corresponding one of the combustion parameter deviations Δy has changed by a given amount.

After all the command value changes ΔD are calculated in step S19, the ECU 20 select one of the controlled parameters as the target controlled parameters through steps S20 to S24, but may alternatively execute the operations of steps S20 to S24 before step S19. Specifically, the ECU 20 may select one of the controlled parameters as the target controlled parameter and then calculate the command value changed ΔD that is an amount by which the target value of the selected one of the controlled parameters is to be changed. The command value changes ΔD of the non-selected controlled parameters are set to zero.

The threshold value TH2 for use in step S22 of FIG. 4(b) may be variable. Specifically, the ECU 20 decreases the threshold value TH2 at a given time interval. This avoids an undesirable rapid change in value of the combustion parameter (i.e., the combustion state of fuel in the engine 10). The ECU 20 may change the threshold value TH2 based on the operating condition of the engine 10.

The engine control system works to bring the actual values of the combustion parameters and the performance parameters into agreement with the target values thereof in feedback mode, but however, may alternatively be designed to control at least one of the former and the latter in open-loop mode. For instance, the ECU 20 may control the combustion parameters in the open-loop mode. In this case, the combustion parameter deviation calculator 60 and the integrator 71 may be omitted from the structure of FIG. 1(a). The target combustion parameter calculator 52 outputs the target combustion parameters Qtg directly to the command value calculator 72. The command value calculator 72 determines the control command values D through the controlled parameter arithmetic expression based on the target combustion parameters Qtg.

Either of both of the combustion parameter arithmetic expression and the controlled parameter arithmetic expression may be replaced with maps which represent optimal values of the combustion parameters in relation to the performance parameters and optimal values of the controlled parameters in relation to the combustion parameters.

What is claimed is:

1. An engine control apparatus which controls a plurality of combustion parameters representing combustion states in an engine based on a plurality of controlled parameters which control operations of actuators mounted on the engine, thereby controlling performance parameters representing performances of the engine, the engine control apparatus comprising a computer processor and being at least configured to perform:

a deviation calculation for calculating deviations of actual values of the combustion parameters from target values of the combustion parameters;

a controlled parameter selection for selecting at least one of the controlled parameters whose correlations with the combustion parameters are predefined according to a degree of the deviation in order to eliminate the deviation, as calculated by said deviation calculation; and a combustion control for determining the controlled parameter, as selected by said controlled parameter selection, as a controlled target, and executing combustion control for the engine based on said deviation, wherein degrees of the correlations between the respective combustion parameters and the respective controlled parameters are predetermined;

when selecting the controlled parameter according to the degree of the deviation, said controlled parameter selection selects, as the controlled target, the controlled parameter whose degree of the correlation with the combustion parameters other than the combustion parameter contributing to said deviation is small;

degrees of sensitivity of each of the combustion parameters to respective changes in the controlled parameters are predetermined, the controlled parameter selection selects, as the controlled targets, the controlled parameters which are different in degree of the sensitivity from each other according to the degrees of the deviations; and when the deviation of the combustion parameter is greater than a given value, the controlled parameter which is higher in degree of sensitivity to the combustion parameter is selected; while when the deviation of the combustion parameter is smaller than the given value, the controlled parameter which is lower in degree of sensitivity to the combustion parameter is selected.

2. An engine control apparatus as set forth in claim 1, wherein the engine control apparatus is at least further configured to perform selection of the combustion parameters as controlled targets based on the deviations of the combustion parameters, as calculated by the deviation calculation, and wherein when the plurality of combustion parameters are selected as the controlled targets, the controlled parameter selection selects the controlled parameters as the controlled targets depending upon which of the performance parameters are high in degree of correlation with the selected combustion parameters.

3. An engine control apparatus as set forth in claim 1, wherein the engine control apparatus is at least further configured to perform selection of the combustion parameters as controlled parameters based on the deviations of the combustion parameters, as calculated by the deviation calculation, and wherein when the plurality of combustion parameters are selected as the controlled targets, the controlled parameter selection selects the controlled parameters as the controlled targets so as to sequentially change the deviations of said selected combustion parameters.

* * * * *